United States Patent
Mimura et al.

(10) Patent No.: US 8,144,562 B2
(45) Date of Patent: Mar. 27, 2012

(54) OPTICAL DISC APPARATUS, METHOD OF CONTROLLING THE SAME, AND INFORMATION STORAGE MEDIUM

(75) Inventors: Satoshi Mimura, Tokyo (JP); Takashi Enokihara, Tokyo (JP); Kiyoshi Tsuboi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 184 days.

(21) Appl. No.: 12/468,987

(22) Filed: May 20, 2009

(65) Prior Publication Data

US 2009/0290479 A1 Nov. 26, 2009

(30) Foreign Application Priority Data

May 26, 2008 (JP) .................................. 2008-136780

(51) Int. Cl.
*G11B 7/00* (2006.01)
(52) U.S. Cl. ......................................................... 369/94
(58) Field of Classification Search .................. None
See application file for complete search history.

(56) References Cited

U.S. PATENT DOCUMENTS

2007/0019516 A1* 1/2007 Kobayashi ................. 369/44.27
2008/0025186 A1 1/2008 Kobayashi

FOREIGN PATENT DOCUMENTS

| JP | 10-74356 | 3/1998 |
|---|---|---|
| JP | 11-120684 | 4/1999 |
| JP | 2000-195066 | 7/2000 |
| JP | 2002-197680 | 7/2002 |
| JP | 2003-338035 | 11/2003 |
| JP | 2004-273000 | 9/2004 |
| JP | 2007-52896 | 3/2007 |
| JP | 2007-334981 | 12/2007 |
| JP | 2008-52857 | 3/2008 |

OTHER PUBLICATIONS

Japanese Notice of Rejection, dated Mar. 23, 2010, for corresponding Japanese Patent Application No. 2008-136780.

* cited by examiner

*Primary Examiner* — Wayne Young
*Assistant Examiner* — Brian Butcher
(74) *Attorney, Agent, or Firm* — Katten Muchin Rosenman LLP (57) ABSTRACT

An optical disc apparatus includes an optical pickup for outputting an output signal according to reflected light from an optical disc medium and a comparison signal output unit for outputting a comparison signal indicating whether a level of the output signal is higher than a threshold value, relatively moves an objective lens with respect to a surface of the medium within a predetermined range to measure a maximum level of the output signal, sets a value determined according to the maximum level as a threshold value used by the comparison signal output unit, and measures a level of a reflected signal corresponding to reflected light from each of a plurality of signal surfaces based on the output signal in a time period in which the comparison signal indicates that the level of the output signal is higher than the set threshold value, while moving the objective lens.

6 Claims, 4 Drawing Sheets

OPTICAL DISC APPARATUS, METHOD OF CONTROLLING THE SAME, AND INFORMATION STORAGE MEDIUM

BACKGROUND OF THE INVENTION

1. Field of the Invention

The present invention relates to an optical disc apparatus for reading information recorded on an optical disc medium such as a CD, a DVD, or a Blu-ray disc (trademark), a method of controlling the optical disc apparatus, and an information storage medium.

2. Description of the Related Art

In recent years, various types of optical disc media have been used as information recording media. In general, the optical disc medium has a structure in which a plurality of layers such as a data recording layer for recording information thereon and a protective layer for protecting the data recording layer are laminated. Nowadays, in particular, in order to improve a recording density, there also exists an optical disc medium including a plurality of the data recording layers, which enables the information to be recorded on or to be read from each of the data recording layers. In order to read the information recorded on such an optical disc medium, an optical disc apparatus is used. The optical disc apparatus includes an optical pickup for irradiating the optical disc medium with light to detect light reflected from the optical disc medium.

When the optical disc apparatus reads the information recorded on the optical disc medium, it is necessary to adjust a focus of an objective lens included in the optical pickup to be on a signal surface (surface of the data recording layer) of the optical disc medium. Therefore, when the information is read, the optical disc apparatus performs a focus detection operation for detecting a focus state where the focus of the objective lens is on the signal surface based on an output signal from the optical pickup (for example, see Japanese Patent Application Laid-open No. 2007-052896).

The state where the focus of the objective lens is on the signal surface can be detected, for example, in the following manner. Specifically, in the case where the objective lens is gradually brought closer to a surface of the optical disc medium, a pull-in signal (PI signal) indicating a total level of the output signals from the optical pickup exhibits a peak when the focus of the objective lens is on the signal surface. In addition, a focus error signal (FE signal) indicating a deviation of a focal position of the objective lens with respect to the signal surface has a predetermined waveform in the vicinity of the state where the focus of the objective lens is on the signal surface. Therefore, the focus state can be detected by detecting a waveform of the FE signal, which satisfies a certain condition within the range where a level of the PI signal is equal to or higher than a given threshold value. For such a purpose, a circuit for outputting a comparison signal (focus OK (FOK) signal) indicating whether or not the level of the PI signal is a given threshold value Th or higher is provided. The FOK signal is, for example, a binary signal which has a High level when the level of the PI signal is equal to or higher than the threshold value Th and has a Low level when the level of the PI signal is less than the threshold value Th. The comparison circuit for outputting such an FOK signal can be easily realized by a simple circuit such as a comparator.

SUMMARY OF THE INVENTION

In the related art described above, in order to perform the focus detection operation with good accuracy without causing an error, it is desirable to measure a light reflectance of the signal surface of the optical disc medium in advance, prior to the start of reading or writing of the information, and to perform the focus detection operation by using the measured reflectance. The reflectance is represented by a level of the output signal output from the optical pickup in the state where the focus of the objective lens is on the signal surface. Therefore, prior to the reading or the writing of the information, a level of a reflected signal generated by reflection from the signal surface needs to be measured.

When the optical disc medium includes only one data recording layer, a maximum value of the PI signal is acquired by a peak hold circuit while the objective lens is being brought closer to the surface of the optical disc medium within a predetermined distance range from a predetermined initial position. As a result, the acquired maximum value can be estimated to be a peak level of the PI signal due to the reflected signal from the signal surface. In the case where the optical disc medium includes a plurality of the data recording layers, however, a plurality of peaks are generated by reflected signals from a plurality of the signal surfaces respectively corresponding to the plurality of data recording layers if the PI signal is measured in the manner as described above. Therefore, the level of the reflected signal from each of the plurality of signal surfaces cannot be measured by the method of simply acquiring the maximum value.

Therefore, a method of measuring the level of the reflected signal from each of the signal surfaces by using the FOK signal described above is conceived. Specifically, the threshold value Th for outputting the FOK signal is set smaller than the peak level of the reflected signal from each of the signal surfaces, and larger than a signal level at a position corresponding to each valley between the peaks. In this manner, a High level signal is output as the FOK signal during a time period in which each of the peaks to be detected appears. Therefore, the level of the reflected signal from each of the signal surfaces can be acquired by acquiring the maximum value of the PI signal while the level of the FOK signal is High. According to such a method, it is not necessary, for example, to add a circuit for detecting the valley itself between the peaks of the PI signal. Therefore, the reflectance of each of the signal surfaces can be measured without complicating a hardware configuration.

Figure 5:
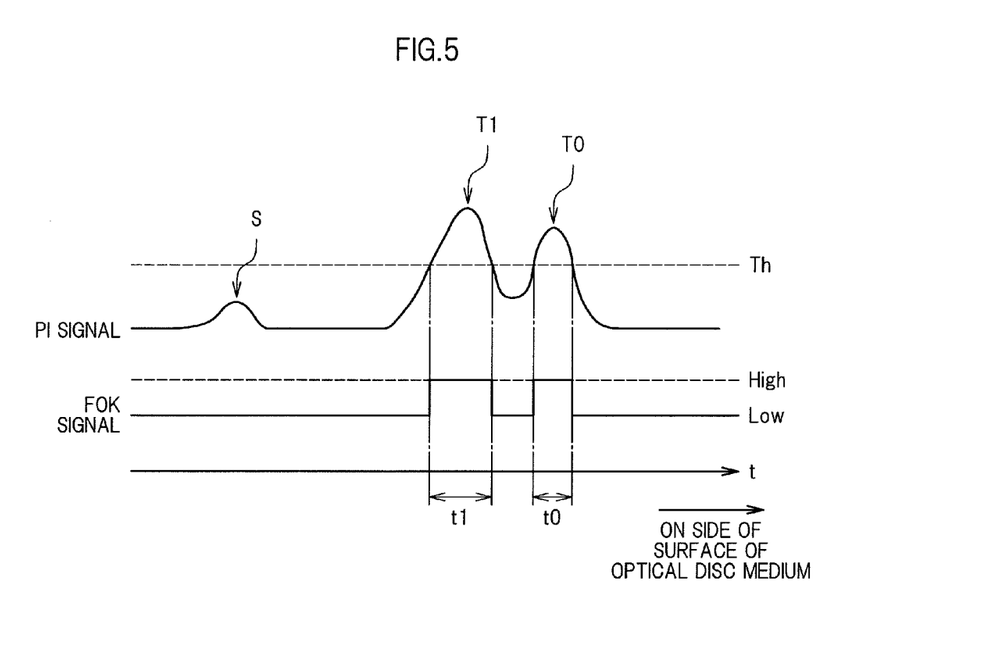
FIG. 5 is a graph showing an example of outputs of the PI signal and an FOK signal.

As a specific example, FIG. 5 illustrates an example of the PI signal and the FOK signal which are output when a measurement is performed for the optical disc medium including two data recording layers while the objective lens is being brought closer to the surface of the optical disc medium. In the example illustrated in FIG. 5, in addition to a peak due to the reflected signal from the surface of the optical disc medium (surface-reflected signal S), peaks due to reflected signals from two signal surfaces corresponding to the respective data recording layers (signal surface-reflected signals T1 and T0) appear in the PI signal. Then, there are time periods t1 and t0, in which the level of the FOK signal becomes High, to correspond to the respective peaks due to the signal surface-reflected signals T1 and T0. The maximum value of the PI signal in the time period t1 represents the level of the signal surface-reflected signal T1, whereas the maximum value of the PI signal in the time period t0 represents the level of the signal surface-reflected signal T0.

When the level of the reflected signal from each of the plurality of signal surfaces is to be acquired by the method as described above, the threshold value Th needs to be set lower than the peak level due to each of the signal surface-reflected signals, and higher than the level of the valley between the peaks. For some types of optical disc media, however, the light reflectance of the signal surface may vary greatly for each optical disc medium. Therefore, it is difficult to set the threshold value Th which allows the peak due to each of the signal surface-reflected signals to be detected for all types of optical disc medium.

Figure 6A:
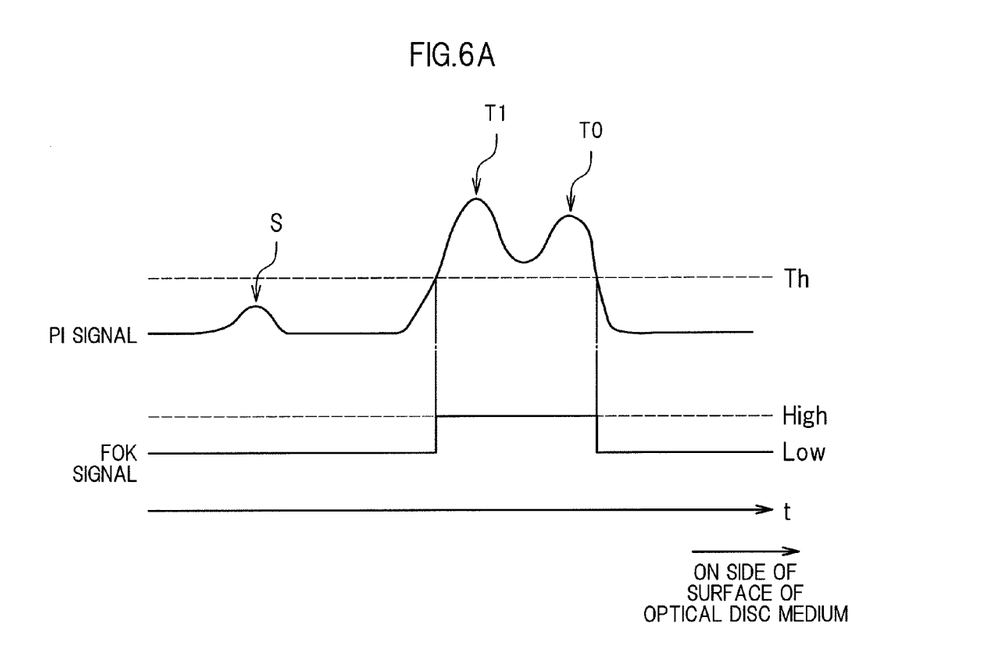
FIGS. 6A and 6B are graphs, each showing an example of the outputs of the PI signal and the FOK signal.
Figure 6B:
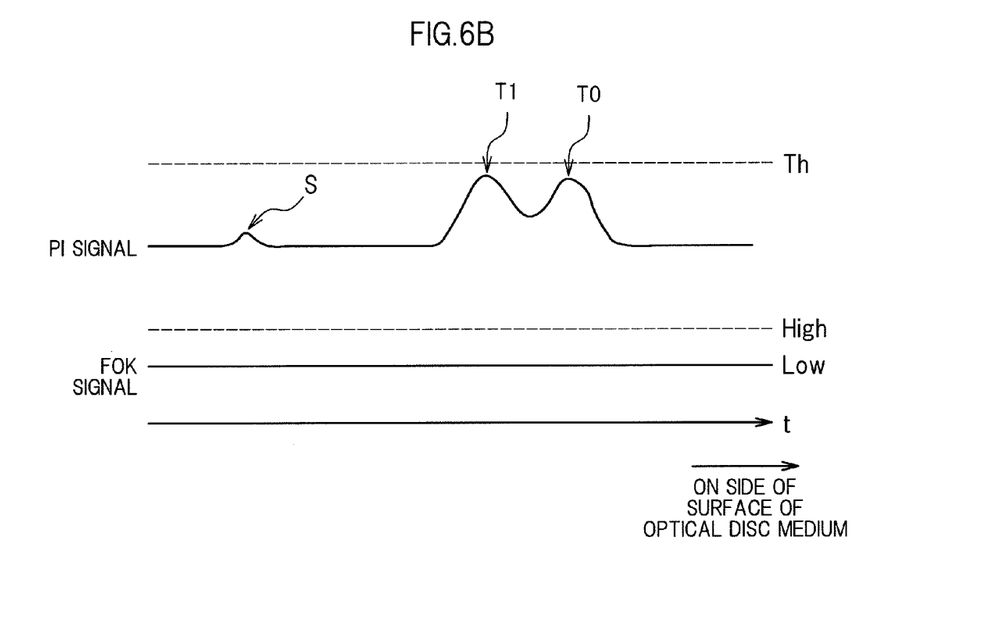

For example, each of FIGS. 6A and 6B illustrates an example of the outputs of the PI signal and the FOK signal for the optical disc medium including two data recording layers, as in the example illustrated in FIG. 5. In the example illustrated in FIG. 6A, since the threshold value Th is too small with respect to the light reflectance of the optical disc medium, two peaks appear in a single time period in which the level of the FOK signal is High. Therefore, the signal surface-reflected signals T1 and T0 cannot be distinguished from each other based on the FOK signal. On the other hand, in the example illustrated in FIG. 6B, the threshold value Th is too large with respect to the light reflectance of the optical disc medium. Therefore, the level of the FOK signal does not become High even when the PI signal exhibits the peaks due to the signal surface-reflected signals T1 and T0. As a result, even in this case, the signal surface-reflected signals T1 and T0 cannot be distinguished from each other based on the FOK signal. Moreover, when the reflectance varies for each of the plurality of signal surfaces included in the single optical disc medium, it is also difficult to detect the level of each of the signal surface-reflected signals by the method described above.

The present invention has been made in view of the actual condition described above, and has an object of providing an optical disc apparatus capable of measuring a level of a reflected signal from each of a plurality of signal surfaces without complicating a hardware configuration, a method of controlling the optical disc apparatus, and an information storage medium.

In order to solve the above-mentioned problem, according to the present invention, an optical disc apparatus for reading information recorded on an optical disc medium including a plurality of signal surfaces, includes: an optical pickup including an objective lens, for outputting an output signal according to reflected light from the optical disc medium; a drive unit for relatively moving the objective lens included in the optical pickup with respect to a surface of the optical disc medium in a direction of changing a distance to the surface of the optical disc medium; a comparison signal output unit for outputting a comparison signal indicating whether or not a level of the output signal output from the optical pickup is equal to or higher than a given threshold value; maximum signal level measurement means for causing the drive unit to move the objective lens within a predetermined range to measure a maximum level of the output signal output from the optical pickup within the predetermined range; threshold value setting means for setting a value determined according to the measured maximum level as a threshold value used by the comparison signal output unit; and signal surface reflection measurement means for measuring a level of a reflected signal corresponding to reflected light from each of the plurality of signal surfaces based on the output signal in a time period in which the comparison signal indicates that the level of the output signal is equal to or higher than the set threshold value, while the objective lens is being moved by the drive unit.

In the above-mentioned optical disc apparatus, the threshold value setting means may set a value obtained by multiplying the measured maximum level by a predetermined rate as the threshold value.

In the above-mentioned optical disc apparatus, the threshold value setting means may set a value equal to or higher than a predetermined lower limit value as the threshold value.

In the above-mentioned optical disc apparatus, the maximum signal level measurement means may measure the maximum level simultaneously with processing for determining a type of the optical disc medium, and the threshold value setting means may determine the threshold value according to the determined type of the optical disc medium and the measured maximum level.

According to the present invention, there is provided a method of controlling an optical disc apparatus for reading information recorded on an optical disc medium including a plurality of signal surfaces, the optical disc apparatus including: an optical pickup including an objective lens, for outputting an output signal according to reflected light from the optical disc medium; a drive unit for relatively moving the objective lens included in the optical pickup with respect to a surface of the optical disc medium in a direction of changing a distance to the surface of the optical disc medium; and a comparison signal output unit for outputting a comparison signal indicating whether or not a level of the output signal output from the optical pickup is equal to or higher than a given threshold value, the method including: causing the drive unit to move the objective lens within a predetermined range to measure a maximum level of the output signal output from the optical pickup within the predetermined range; setting a value determined according to the measured maximum level as a threshold value used by the comparison signal output unit; and measuring a level of a reflected signal corresponding to reflected light from each of the plurality of signal surfaces based on the output signal in a time period in which the comparison signal indicates that the level of the output signal is equal to or higher than the set threshold value, while the objective lens is moved by the drive unit.

According to the present invention, a computer readable information storage medium stores a program for controlling an optical disc apparatus for reading information recorded on an optical disc medium including a plurality of signal surfaces, the optical disc apparatus including: an optical pickup including an objective lens, for outputting an output signal according to reflected light from the optical disc medium; a drive unit for relatively moving the objective lens included in the optical pickup with respect to a surface of the optical disc medium in a direction of changing a distance to the surface of the optical disc medium; and a comparison signal output unit for outputting a comparison signal indicating whether or not a level of the output signal output from the optical pickup is equal to or higher than a given threshold value, the program controlling a computer to function as: maximum signal level measurement means for causing the drive unit to move the objective lens within a predetermined range to measure a maximum level of the output signal output from the optical pickup within the predetermined range; threshold value setting means for setting a value determined according to the measured maximum level as a threshold value used by the comparison signal output unit; and signal surface reflection measurement means for measuring a level of a reflected signal corresponding to reflected light from each of the plurality of signal surfaces based on the output signal in a time period in which the comparison signal indicates that the level of the output signal is equal to or higher than the set threshold value, while the objective lens is moved by the drive unit.

DETAILED DESCRIPTION OF THE INVENTION

Hereinafter, an exemplary embodiment of the present invention is described in detail referring to the accompanying drawings.

Figure 1:
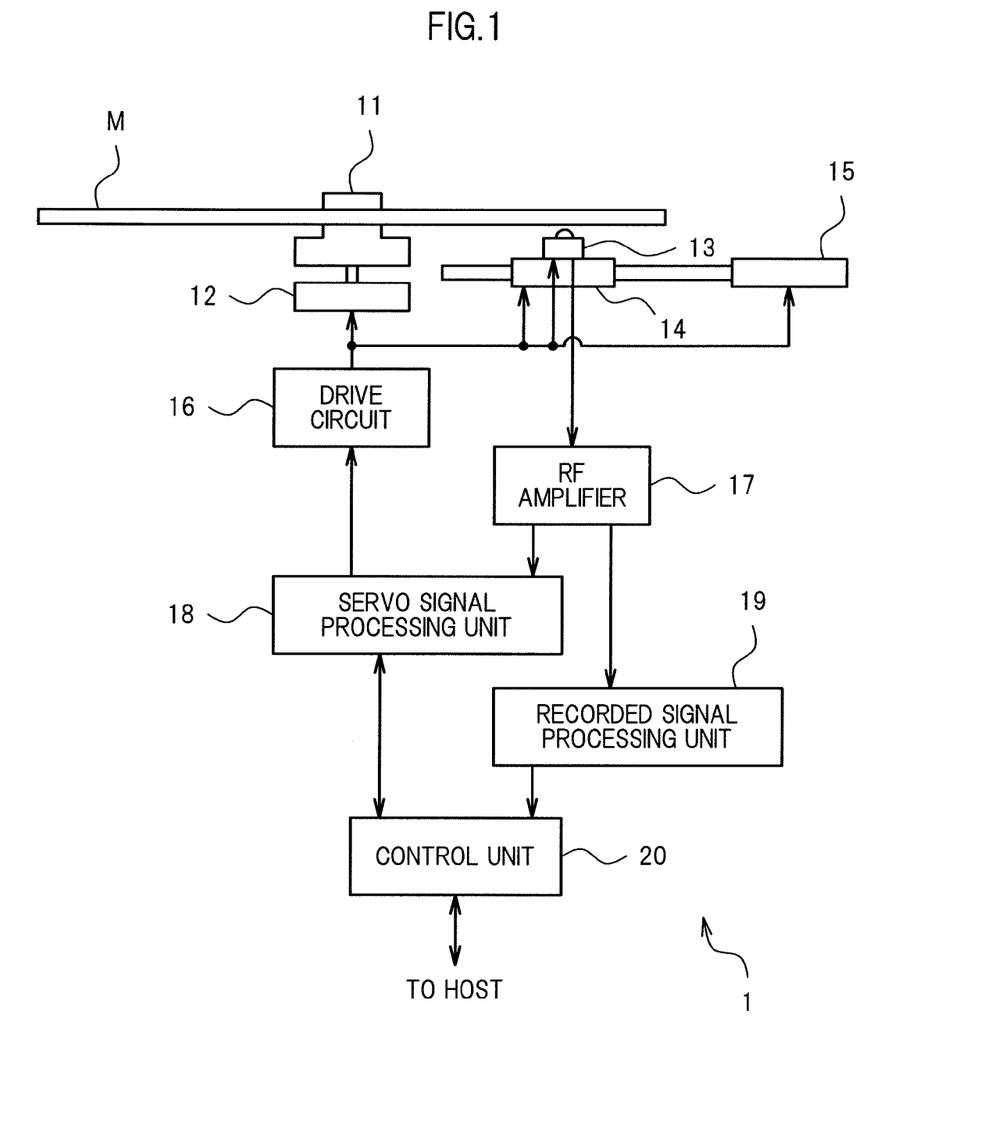
FIG. 1 is a block diagram illustrating a configuration example of an optical disc apparatus according to an embodiment of the present invention.

An optical disc apparatus 1 according to the embodiment of the present invention reads information recorded on an optical disc medium. As illustrated in FIG. 1, the optical disc apparatus 1 includes a medium supporting portion 11, a spindle motor 12, an optical pickup 13, a three-axis actuator 14, a feed motor 15, a drive circuit 16, an RF amplifier 17, a servo signal processing unit 18, a recorded signal processing unit 19, and a control unit 20.

An optical disc medium M, from which the information is to be read by the optical disc apparatus 1, includes data recording layers on which the information is recorded, and protective layers for protecting the data recording layers, which are provided on both sides of the data recording layers. Hereinafter, a surface of each data recording layer is referred to as a signal surface. The optical disc apparatus 1 may be configured not only to read the recorded information from the optical disc medium M but also to be capable of writing the information to the optical disc medium M. Further, the optical disc apparatus 1 may also be configured to be capable of reading the information recorded on a plurality of types of optical disc media M such as a CD, a DVD, and a Blu-ray disc. Hereinafter, the optical disc medium M includes two data recording layers as a specific example. The respective signal surfaces of the two data recording layers are denoted as signal surfaces L1 and L0, respectively.

The medium supporting portion 11 rotatably supports the optical disc medium M. The medium supporting portion 11 also rotates the optical disc medium M using power transmitted from the spindle motor 12.

The optical pickup 13 irradiates the optical disc medium M with light, and detects that part of the radiated light that is reflected by the optical disc medium M to output an output signal according to the detected reflected light. The optical pickup 13 can be moved by the three-axis actuator 14 in two directions including a diameter direction of the optical disc medium M and a direction vertical to the surface of the optical disc medium M (that is, a direction along a rotation axis of the optical disc medium M). Further, the three-axis actuator 14 can change the relative tilt of the optical pickup 13 with respect to the optical disc medium M. The three-axis actuator 14 moves the optical pickup 13 in the direction vertical to the surface of the optical disc medium M to vary a distance from an objective lens 36 included in the optical pickup 13 to the surface of the optical disc medium M.

Figure 2:
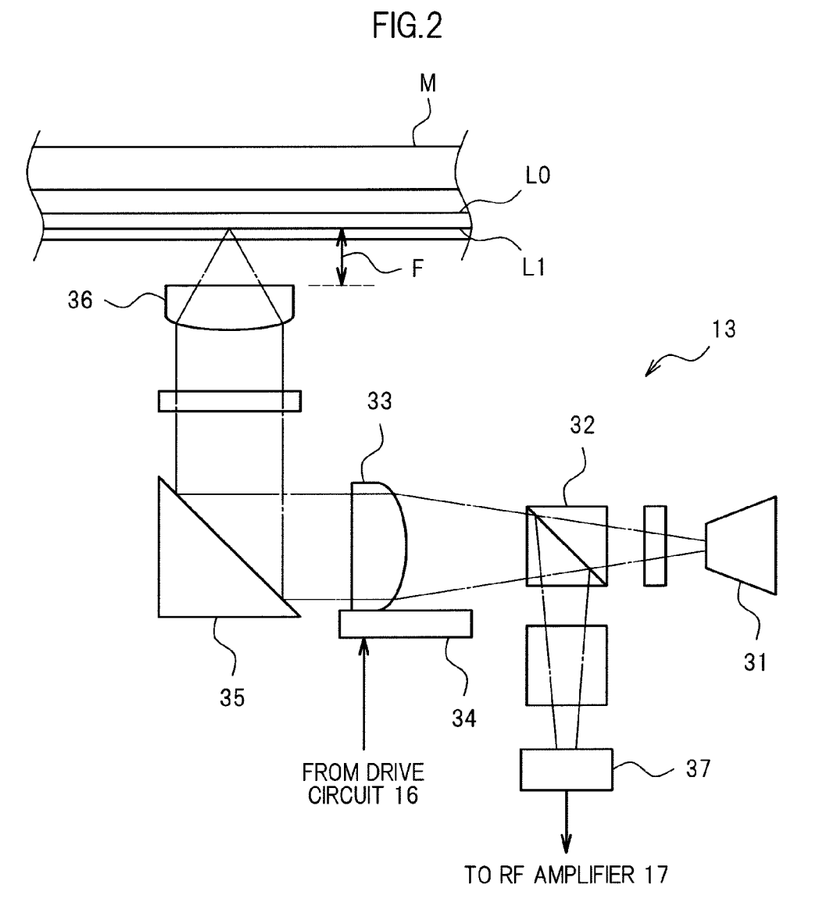
FIG. 2 is a schematic view illustrating an internal configuration example of an optical pickup of the optical disc apparatus according to the embodiment of the present invention.

FIG. 2 is a view illustrating an internal configuration example of the optical pickup 13. In the example illustrated in FIG. 2, the optical pickup 13 includes a light-emitting element 31, a polarization beam splitter 32, a collimator lens 33, a collimator lens driving unit 34, an erecting mirror 35, the objective lens 36, and a photodetector 37.

The light-emitting element 31 is a semiconductor laser element for outputting a laser beam having a predetermined wavelength. The output light emitted from the light-emitting element 31 passes through the polarization beam splitter 32 and the collimator lens 33, and is then reflected by the erecting mirror 35. Further, the output light reflected by the erecting mirror 35 is focused by the objective lens 36 on a focal position apart from the objective lens 36 by a focal length F to be reflected by the optical disc medium M.

After the light reflected by the optical disc medium M passes through the objective lens 36, the reflected light is reflected by the erecting mirror 35 to be guided by the polarization beam splitter 32 toward the photodetector 37. The photodetector 37 includes a plurality of light-receiving elements arranged in, for example, a matrix of N by N. When the reflected light guided by the polarization beam splitter 32 reaches the light-receiving elements, the photodetector 37 outputs a signal according to an intensity of the light received by each of the plurality of light-receiving elements as an output signal.

The collimator lens driving unit 34 includes an actuator and the like, and drives the collimator lens 33 forward and backward along an optical axis direction of the laser beam. The collimator lens driving unit 34 moves the collimator lens 33 along the optical axis direction to enable the correction of spherical aberration of the objective lens 36.

The feed motor 15 moves both the optical pickup 13 and the three-axis actuator 14 along the diameter direction of the optical disc medium M. By the driving of the feed motor 15, the optical pickup 13 can move from a position in the vicinity of the center of the optical disc medium M to the position in the vicinity of an outer periphery of the optical disc medium M.

The drive circuit 16 outputs driving signals for driving the collimator lens driving unit 34, the three-axis actuator 14, the spindle motor 12, and the feed motor 15 according to control signals input from the servo signal processing unit 18. A rotation speed of the spindle motor 12 changes according to the driving signal from the drive circuit 16. As a result, a rotation speed of the optical disc medium M is controlled. Moreover, by driving the three-axis actuator 14 and the feed motor 15 according to the driving signals from the drive circuit 16, a distance of the objective lens 36 from the rotation axis of the optical disc medium M along the diameter direction, and a distance from the objective lens 36 to the surface of the optical disc medium M, are controlled. In this embodiment, the drive circuit 16 and the three-axis actuator 14 function as a drive unit for relatively moving the objective lens 36 with respect to the surface of the optical disc medium M.

The RF amplifier 17, the servo signal processing unit 18, the recorded signal processing unit 19, and the control unit 20 are realized by, for example, an A/D converter for converting the output signal from the optical pickup 13 into a digital signal, and a digital signal processor (DSP), a microcomputer, or the like, for processing the digital signal obtained by the conversion.

The RF amplifier 17 outputs various signals based on the respective output signals of the plurality of light-receiving elements, which are output from the optical pickup 13. Specifically, the RF amplifier 17 amplifies the output signal from each of the light-receiving elements with a given gain to output the obtained signal as an RF signal for data reproduction. The RF amplifier 17 also outputs a pull-in signal (PI signal) obtained by adding all the amplified output signals of the plurality of light-emitting elements. A level of the PI signal represents a total level of the output signals output from the optical pickup 13.

Moreover, the RF amplifier 17 calculates and outputs a focus error signal (FE signal) indicating a deviation of the focal position of the objective lens 36 with respect to the signal surface of the optical disc medium M. As an example, the FE signal is calculated by subtracting the sum of the output signals of the light-receiving elements arranged along a predetermined diagonal direction from the sum of the output signals of the light-receiving elements arranged along a diagonal direction crossing the predetermined diagonal direction from among the plurality of light-receiving elements. Further, the RF amplifier 17 calculates and outputs a tracking error signal (TE signal) indicating a deviation in the diameter direction of the optical disc medium M between a position of a track in the data recording layer, on which the information is recorded, and the focal position of the objective lens 36.

The servo signal processing unit 18 generates various signals for servo control based on the PI signal, the FE signal, and the TE signal which are output from the RF amplifier 17, and outputs the generated signals to the control unit 20. The servo signal processing unit 18 outputs a control signal to the drive circuit 16 for driving the three-axis actuator 14, the collimator lens driving unit 34, the feed motor 15, and the spindle motor 12 according to a command input from the control unit 20.

As a specific example, the servo signal processing unit 18 outputs a comparison signal (focus OK (FOK) signal) indicating whether or not the level of the PI signal is equal to or higher than a given threshold value Th. More specifically, the FOK signal in this case is a binary signal which has a High level when the level of the PI signal is equal to or higher than the threshold value Th and has a Low level when the level of the PI signal is less than the threshold value Th. In this manner, the servo signal processing unit 18 functions as a comparison signal output unit for outputting the FOK signal serving as the comparison signal in this embodiment. The servo signal processing unit 18 also detects a value indicating the maximum value (peak level) of the PI signal while a level of the FOK signal is High, and outputs the detected value to the control unit 20. Further, the servo signal processing unit 18 may output a signal indicating that the focus of the objective lens 36 is on the signal surface (focus zero cross (FZC) signal) based on the result of predetermined processing using a predetermined threshold value, which is performed on the FE signal.

The recorded signal processing unit 19 demodulates the RF signal output from the RF amplifier 17 into a digital signal indicating the information recorded on the optical disc medium M, and outputs the demodulated digital signal to the control unit 20. The recorded signal processing unit 19 also calculates an evaluation value (such as RF amplitude or jitter value) indicating reading accuracy of the optical pickup 13 for the information recorded on the optical disc medium M in response to rise timing of the waveform of the RF signal or the like, and outputs the calculated evaluation value to the control unit 20.

The control unit 20 is constituted by, for example, a microcomputer, and includes an execution module and a storage element. In the storage element of the control unit 20, a program to be executed and various parameters are stored.

The execution module performs processing according to the program stored in the storage element. Specifically, the control unit 20 receives the input of signals from the servo signal processing unit 18 (such as a signal for the result of peak detection of the PI signal, and the FOK signal), and performs processing (focus detection processing) for detecting a position at which the focus of the objective lens 36 is adjusted to be on the signal surface, based on the signals, and for setting a distance between the optical pickup 13 and the optical disc medium M to be at the detected position.

The control unit 20 is connected to a personal computer, a main body of a home game machine, a video decoder or the like, which serves as a host. In response to a request from the host, the control unit 20 outputs an instruction for driving the feed motor 15 or the three-axis actuator 14 to the servo signal processing unit 18 to move the focal position of the objective lens 36 (that is, information reading position on the optical disc medium M) to a desired position on the optical disc medium M. In addition to the operation described above, the control unit 20 outputs an instruction for changing a rotation speed of the spindle motor 12 to the servo signal processing unit 18, to adjust the rotation speed of the optical disc medium M. Then, in this state, the control unit 20 outputs the signal obtained by demodulating the signal read from the optical disc medium M, which is output from the recording signal processing unit 19, to the host side.

Figure 3:
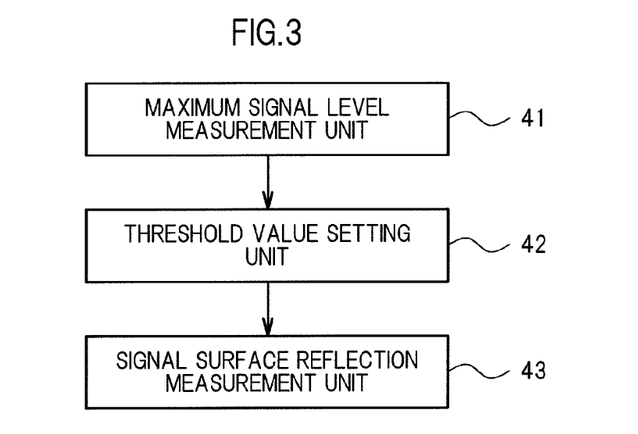
FIG. 3 is a functional block diagram illustrating an example of functions of the optical disc apparatus according to the embodiment of the present invention.

Hereinafter, processing performed by the control unit 20 of the optical disc apparatus 1 in this embodiment is described. The control unit 20 functionally includes a maximum signal level measurement unit 41, a threshold value setting unit 42, and a signal surface reflection measurement unit 43, as illustrated in FIG. 3. The functions are realized in the form of software by the execution of the program stored in the storage element included in the control unit 20 by the control unit 20.

The maximum signal level measurement unit 41 measures a maximum level Lm of the PI signal while a distance of the objective lens 36 from the surface of the optical disc medium M falls within a predetermined range, prior to the start of reading or writing of the information from/to the optical disc medium M. In this case, the predetermined range, in which the objective lens 36 moves, is set to include the positions where the focus of the objective lens 36 is on the signal surfaces L1 and L0. As a result, the maximum level Lm is supposed to be a maximum value of the levels of the PI signal in response to reflected signals due to the reflection from the signal surfaces L1 and L0 (hereinafter, referred to respectively as signal surface-reflected signals T1 and T0).

As a specific example, in the case where the optical disc apparatus 1 is compatible with a plurality of types of optical disc media, the optical disc apparatus 1 first determines the type of the optical disc medium M when the optical disc medium M is newly placed in the optical disc apparatus 1, or when the optical disc apparatus 1 is powered ON. In this type determination processing, for example, a reflected signal due to reflection from the surface of the optical disc medium M (hereinafter, referred to as a surface-reflected signal S) and the signal surface-reflected signal T1 are detected. A distance between the surface of the optical disc medium M and the signal surface L1 is calculated based on a difference between the position of the objective lens 36 for detecting the surface-reflected signal S and that of the objective lens 36 for detecting the signal surface-detected signal T1. The type of the optical disc medium M is determined by using the thus calculated distance. In this case the signal surface L1 is a signal surface, of the two signal surfaces, which is closer to the objective lens 36.

In the type determination processing, the optical disc apparatus 1 moves the objective lens 36 over the distance range including the position where the focus of the objective lens 36 is on the surface of the optical disc medium M and the position where the focus of the objective lens 36 is on the signal surface L1. The maximum signal level measurement unit 41 measures the maximum level Lm simultaneously with the type determination processing, and stores the obtained maximum level of the PI signal in the storage element included in the control unit 20. By measuring the maximum level Lm simultaneously with the type determination processing as described above, the optical disc apparatus 1 according to this embodiment can measure the maximum level Lm without taking any extra time.

Specifically, the maximum signal level measurement unit 41 first rotatably drives the spindle motor 12 to start rotating the optical disc medium M, and drives the three-axis actuator 14 to move the objective lens 36 of the optical pickup 13 to its most distant position (initial position) from the surface of the optical disc medium M. The initial position corresponds to a position where the focal position of the objective lens 36 is situated away from the surface of the optical disc medium M (on the optical pickup 13 side).

Thereafter, the maximum signal level measurement unit 41 controls the three-axis actuator 14 to start an operation of bringing the objective lens 36 closer to the surface of the optical disc medium M at a predetermined speed from the initial position (hereinafter, referred to as sweep operation). The sweep operation is continued until the objective lens 36 reaches a predetermined stop position in the vicinity of the surface of the optical disc medium M. Specifically, the objective lens 36 is moved by the sweep operation within a predetermined range from the initial position to the stop position. Then, the servo signal processing unit 18 outputs a maximum value of the PI signal during the sweep operation to the control unit 20.

Figure 4:
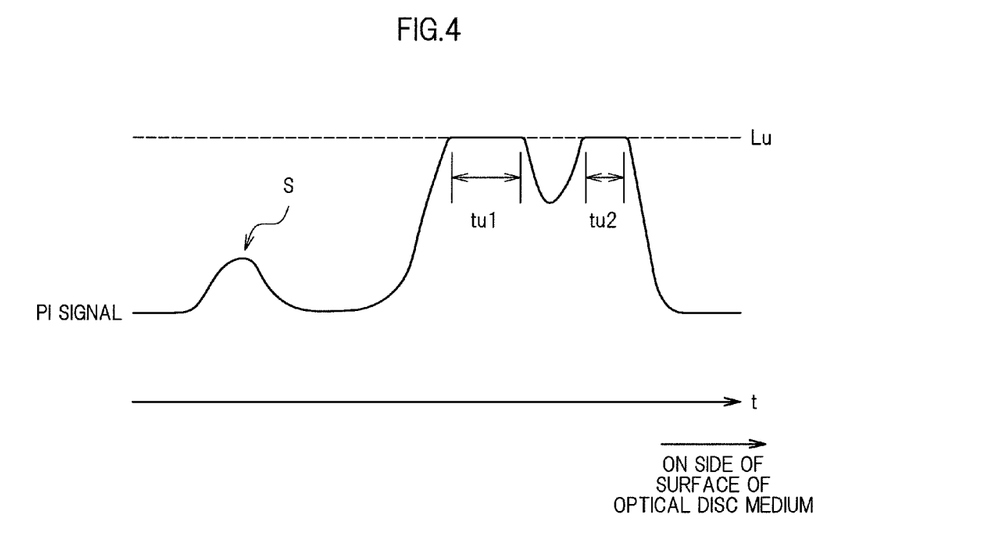
FIG. 4 is a graph showing an example of an output of a PI signal when a level of the PI signal becomes an upper limit value.

The maximum signal level measurement unit 41 sets a gain for signal amplification performed by the RF amplifier 17 to a predetermined value prior to the start of the sweep operation. The gain set for the type determination processing has a value higher than that of a gain for subsequent focus detection processing, to ensure the detection of the surface-reflected signal S independently of the type or individual variability of the optical disc medium M. Therefore, there is a fear that each of the peaks of the PI signal due to the signal surface-reflected signals T1 and T0 may exceed a measurable upper limit value Lu of the PI signal, which is determined by circuit configuration constraints or the like. In such a case, the maximum value of the PI signal, which is output from the servo signal processing unit 18, is the upper limit value Lu. FIG. 4 is a graph showing an example of a waveform of the PI signal when the maximum value of the PI signal is the upper limit value Lu as described above.

The maximum signal level measurement unit 41 uses the value of the gain set for the RF amplifier 17 to calculate the signal level of the PI signal before signal amplification from the maximum value of the PI signal, which is output from the servo signal processing unit 18 as a result of the sweep operation, and records the calculated value as the maximum level Lm.

The threshold value setting unit 42 sets a value determined according to the maximum level Lm measured by the maximum signal level measurement unit 41 as the threshold value Th which is used by the servo signal processing unit 18 for outputting the FOK signal.

As a specific example, the threshold value setting unit 42 sets a value obtained by multiplying the maximum level Lm by a predetermined rate as the threshold value Th. The rate in this case is determined according to a proportion of the level of a portion corresponding to the valley between the peaks due to the signal surface-reflected signals T1 and T0 to the maximum value of the levels of the signal surface-reflected signals T1 and T0. For example, when the proportion is assumed to be 50% or larger, the threshold value Th is calculated by multiplying the maximum level Lm by 50% and then further multiplying the result of the multiplication by the gain of the RF amplifier, which is set for the measurement of the levels of the signal surface-reflected signals by the signal surface reflection measurement unit 43 described below.

Alternatively, the threshold setting unit 42 may determine the threshold value Th according to information of the type of the optical disc medium M, which is determined with the type determination processing implemented simultaneously with the measurement of the maximum level Lm by the maximum signal level measurement unit 41. For example, there is a possibility that the proportion of the level of the valley between the peaks of the PI signal with respect to the maximum value of the levels of the signal surface-reflected signals T1 and T0 may differ for a different type of optical disc medium. Therefore, the optical disc apparatus 1 stores values of the rate, each corresponding to a type of the optical disc medium, in association with each other. The threshold value setting unit 42 multiplies the maximum level Lm by the value of the rate associated with the type of the optical disc medium M, which is determined by the maximum signal level measurement unit 41, to calculate the threshold value Th. As a result, even with the same maximum level Lm, the different threshold value Th can be set for each type of the optical disc medium M.

Further, when the threshold value Th calculated by the method described above is less than a predetermined lower limit value, the threshold value setting unit 42 may set the lower limit value as the threshold value Th. In this manner, even when the measured maximum level Lm is low, the threshold value Th can be set to a value which prevents noise from being picked up.

When the maximum level Lm has a value corresponding to the upper limit value Lu as exemplified in FIG. 4, it is estimated that the maximum level Lm has a value smaller than the maximum value of the levels of the signal surface-reflected signals T0 and T1. In this case, a value larger than the value calculated by the method described above may be set as the threshold value Th. As an example, the maximum signal level measurement unit 41 acquires information for time periods tu1 and tu2 in which the upper limit value Lu is output. The threshold value setting unit 42 performs a correction to add a value, which is obtained by multiplying a value indicating a length of the longer time period of the time periods tu1 and tu2 by a predetermined coefficient, to the maximum level Lm. Then, a value obtained by multiplying the thus corrected maximum level Lm by a predetermined rate as described above is set as the threshold value Th. In this manner, even when the maximum signal level measurement unit 41 cannot measure the maximum value of the levels of the signal surface-reflected signals T1 and T0, the appropriate threshold value Th can be calculated according to the estimated maximum value.

The signal surface reflection measurement unit 43 measures the level of each of the plurality of signal surface-reflected signals based on the PI signal in the time period in which the level of the FOK signal is High (that is, the level of the PI signal is equal to or higher than the threshold value Th set by the threshold value setting unit 42) while the objective lens 36 is being moved.

Specifically, after the threshold value Th is set by the threshold value setting unit 42, the signal surface reflection measurement unit 43 brings the objective lens 36 back to the initial position. Then, after changing the gain of the RF amplifier 17 to a predetermined value, the signal surface reflection measurement unit 43 starts the sweep operation of the objective lens 36 again. Then, the signal surface reflection measurement unit 43 sequentially acquires the maximum value of the PI signal while the level of the FOK signal is High, which is output from the servo signal processing unit 18, as the value of the peak level due to each of the signal surface-reflected signals.

Since the threshold value Th of the PI signal is determined according to the maximum level Lm measured by the maximum signal level measurement unit 41, it is assumed that the threshold value Th of the PI signal is smaller than the values of the peak levels due to the signal surface-reflected signals T1 and T0 and larger than the level of the portion corresponding to the valley between the peaks due to the signal surface-reflected signals T1 and T0. Therefore, as illustrated in FIG. 5, the level of the FOK signal becomes High twice during the sweep operation in response to the two peaks due to the signal surface-reflected signals. The maximum values of the PI signal during the time periods in which the level of the FOK signal is High, respectively represent the signal levels of the signal surface-reflected signals T1 and T0.

As described above, when the levels of the PI signal due to the signal surface-reflected signals T1 and T0 (specifically, values indicating the respective light reflectances of the signal surfaces L1 and L0) are measured, the control unit 20 starts processing for reading or writing the information from/to the optical disc medium M. At this time, as described above, the control unit 20 performs the focus detection processing for adjusting the focus of the objective lens 36 to be on one of the signal surfaces L1 and L0, from/to which the information is to be read/written, by moving the objective lens 36 with respect to the surface of the optical disc medium M. In this case, the focus detection processing is performed by using the value of the signal level of the signal surface-reflected signal T1 or T0, which is measured by the signal surface reflection measurement unit 43. As a result, the optical disc apparatus 1 can reduce the probability of occurrence of an error during the focus detection processing or reduce the time of a preliminary operation for the focus detection processing.

According to the optical disc apparatus 1 according to this embodiment described above, the value determined according to the pre-measured maximum value of the PI signal is set as the threshold value Th for the PI signal. As a result, even when the optical disc medium M includes a plurality of data recording layers, the output of the FOK signal using the threshold value This utilized to measure the level of the reflected signal corresponding to the reflected light from each of the signal surfaces. Then, the level of the reflected signal can be used for subsequent processing, such as the focus detection operation. Here, the FOK signal is the comparison signal indicating whether or not the level of the PI signal is equal to or higher the threshold value Th. Since the comparison signal output unit for outputting such a comparison signal can be realized with a simple hardware configuration, the hardware configuration of the optical disc apparatus 1 can be prevented from being complicated.

The embodiment of the present invention is not limited to that described above. For example, in the above-mentioned description, the level of the signal surface-reflected signal, which is measured by the signal surface reflection measurement unit 43, is used for the focus detection processing. However, the level of the signal surface-reflected signal may be used for various processing other than the focus detection processing. Moreover, though the optical disc medium M includes the two data recording layers in the above-mentioned description, the level of the reflected signal from each of the signal surfaces corresponding to the respective data recording layers can be measured by the method described above even when the optical disc medium M includes three or more data recording layers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical disc apparatus for reading information recorded on an optical disc medium including a plurality of signal surfaces, comprising:
    an optical pickup including an objective lens, for outputting an output signal according to reflected light from the optical disc medium;
    a drive unit for relatively moving the objective lens included in the optical pickup with respect to a surface of the optical disc medium in a direction of changing a distance to the surface of the optical disc medium;
    a comparison signal output unit for outputting a comparison signal indicating whether or not a level of the output signal output from the optical pickup is equal to or higher than a given threshold value;
    maximum signal level measurement means for causing the drive unit to move the objective lens within a predetermined range to measure a maximum level of the output signal output from the optical pickup within the predetermined range;
    threshold value setting means for setting a value determined according to the measured maximum level as a threshold value used by the comparison signal output unit; and
    signal surface reflection measurement means for measuring a level of a reflected signal corresponding to reflected light from each of the plurality of signal surfaces based on a maximum value of the output signal in each of a plurality of time periods in which the comparison signal indicates that the level of the output signal is equal to or higher than the set threshold value, while moving the objective lens again by the drive unit within the predetermined range after the measurement of the maximum level of the output signal by the maximum signal level measurement means.

2. An optical disc apparatus according to claim 1, wherein the threshold value setting means sets a value obtained by multiplying the measured maximum level by a predetermined rate as the threshold value.

3. An optical disc apparatus according to claim 1, wherein the threshold value setting means sets a value equal to or higher than a predetermined lower limit value as the threshold value.

4. An optical disc apparatus according to claim 1,
    wherein the maximum signal level measurement means measures the maximum level simultaneously with processing for determining a type of the optical disc medium, and
    wherein the threshold value setting means determines the threshold value according to the determined type of the optical disc medium and the measured maximum level.

5. A method of controlling an optical disc apparatus for reading information recorded on an optical disc medium including a plurality of signal surfaces, the optical disc apparatus comprising: an optical pickup including an objective lens, for outputting an output signal according to reflected light from the optical disc medium; a drive unit for relatively moving the objective lens included in the optical pickup with respect to a surface of the optical disc medium in a direction of changing a distance to the surface of the optical disc medium; and a comparison signal output unit for outputting a comparison signal indicating whether or not a level of the output signal output from the optical pickup is equal to or higher than a given threshold value, the method comprising:
    causing the drive unit to move the objective lens within a predetermined range to measure a maximum level of the output signal output from the optical pickup within the predetermined range;
    setting a value determined according to the measured maximum level as a threshold value used by the comparison signal output unit; and
    measuring a level of a reflected signal corresponding to reflected light from each of the plurality of signal surfaces based on a maximum value of the output signal in each of a plurality of time periods in which the comparison signal indicates that the level of the output signal is equal to or higher than the set threshold value, while moving the objective lens again by the drive unit within the predetermined range after the measurement of the maximum level of the output signal.

6. A non-transitory computer readable information storage medium storing a program for controlling an optical disc apparatus for reading information recorded on an optical disc medium including a plurality of signal surfaces, the optical disc apparatus comprising: an optical pickup including an objective lens, for outputting an output signal according to reflected light from the optical disc medium; a drive unit for relatively moving the objective lens included in the optical pickup with respect to a surface of the optical disc medium in a direction of changing a distance to the surface of the optical disc medium; and a comparison signal output unit for outputting a comparison signal indicating whether or not a level of the output signal output from the optical pickup is equal to or higher than a given threshold value, the program controlling a computer to function as:
    maximum signal level measurement means for causing the drive unit to move the objective lens within a predetermined range to measure a maximum level of the output signal output from the optical pickup within the predetermined range;
    threshold value setting means for setting a value determined according to the measured maximum level as a threshold value used by the comparison signal output unit; and
    signal surface reflection measurement means for measuring a level of a reflected signal corresponding to reflected light from each of the plurality of signal surfaces based on a maximum value of the output signal in each of a plurality of time periods in which the comparison signal indicates that the level of the output signal is equal to or higher than the set threshold value, while moving the objective lens again by the drive unit within the predetermined range after the measurement of the maximum level of the output signal by the maximum signal level measurement means.

* * * * *